(12) United States Patent
Feuillerac et al.

(10) Patent No.: US 11,541,985 B2
(45) Date of Patent: Jan. 3, 2023

(54) AIRCRAFT DUCT ASSEMBLY WITH SLIDEWAY MOUNTING

(71) Applicant: Airbus Operations SAS, Toulouse (FR)

(72) Inventors: Laurent Feuillerac, Toulouse (FR); Patrick Salgues, Toulouse (FR); Vincent Auriac, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 86 days.

(21) Appl. No.: 17/123,454

(22) Filed: Dec. 16, 2020

(65) Prior Publication Data

US 2021/0188445 A1 Jun. 24, 2021

(51) Int. Cl.
*B64C 1/40* (2006.01)

(52) U.S. Cl.
CPC .................................. *B64C 1/406* (2013.01)

(58) Field of Classification Search
CPC ............ B64C 1/068; B64C 1/06; B64C 1/406
See application file for complete search history.

(56) References Cited

U.S. PATENT DOCUMENTS

| 2005/0242245 | A1 | 11/2005 | Balderama et al. | |
| 2019/0039747 | A1* | 2/2019 | Gilbertson | F16L 3/237 |

FOREIGN PATENT DOCUMENTS

| CN | 104048110 A | 9/2014 | |
| DE | 102006025388 B4 * | 10/2009 | ............. B64C 1/066 |
| DE | 102009029754 A1 | 12/2010 | |
| EP | 0620395 A1 | 10/1994 | |
| EP | 3438001 A1 | 2/2019 | |
| FR | 2961490 A1 * | 12/2011 | ............... B64C 1/40 |
| WO | 8601646 A1 | 3/1986 | |

OTHER PUBLICATIONS

French Search Report; priority document.

* cited by examiner

*Primary Examiner* — Timothy D Collins
*Assistant Examiner* — Eric Acosta
(74) *Attorney, Agent, or Firm* — Greer, Burns & Crain, Ltd.

(57) ABSTRACT

An aircraft duct assembly comprising at least two ducts extending along a general direction of rectilinear extent, each duct being an electrical, hydraulic or aeraulic duct connected to a duct support. The duct support comprises a first slideway element configured to cooperate with a second slideway element to form a slideway in the general direction of extent of the ducts. The duct assembly can thus be inserted, after mounting, by translation along the direction of the slideway into an aircraft fuselage portion. The mounting of the duct assembly and installation thereof in a fuselage are simplified, and the duct assembly is more reliable.

10 Claims, 5 Drawing Sheets

AIRCRAFT DUCT ASSEMBLY WITH SLIDEWAY MOUNTING

CROSS-REFERENCES TO RELATED APPLICATIONS

This application claims the benefit of the French patent application No. 1914713 filed on Dec. 18, 2019, the entire disclosures of which are incorporated herein by way of reference.

FIELD OF THE INVENTION

The present invention concerns the field of the electrical, hydraulic and aeraulic architectures of aircraft. It relates to the architecture of any type of aircraft, in particular commercial aircraft for passenger transport and cargo-type aircraft.

BACKGROUND OF THE INVENTION

Aircraft comprise, according to a conventional configuration, a, for example substantially cylindrical or bilobed, elongate fuselage based on a structure comprising an assembly of annular frames interconnected by straight longitudinal structural elements referred to as stringers and stiffeners.

Within the fuselage, at least one floor is formed. The floor is substantially horizontal when the aircraft is on the ground. The floor is generally intended for the movement of passengers and/or for the installation of the interior furniture in a passenger transport aircraft, or for accommodating a part of the cargo in a cargo aircraft. The space above the floor in which passengers or goods are installed is called the "cabin", whereas the space below the floor comprises the aircraft hold and also various systems (landing gear in their respective landing gear compartment, central region of the wing, etc.).

It is also below the lowest floor of the aircraft that there are provided most of the electrical, hydraulic and aeraulic ducts of the aircraft, and, in particular, the main ducts which run longitudinally from the front to the rear of the fuselage to distribute the electricity or the fluid in question to the consumers distributed within the aircraft.

The longitudinal ducts are thus arranged generally in a region situated just below the floor, on one side (or, where appropriate, on each side) of the aircraft.

Insofar as the floor is situated in the diametral horizontal plane of the fuselage, or below this plane, the region for routing the ducts has a substantially triangular cross section. More precisely, this region has a cross section substantially in the form of a right-angled triangle whose hypotenuse is curved (owing to the cylindrical shape of the fuselage). The region for installing the ducts is thus sometimes referred to as "triangle region".

While this region is very well adapted for installing the longitudinal ducts on account of its configuration, of its position and on account of the fact that it can be exploited only with difficulty for other functions, this region is nevertheless difficult to access and confined. This makes the laying of the ducts more complex, all the more so since they can be laid only in the form of successive butt-jointed portions. The butt-jointing and the connection of the ducts are sometimes complex to implement owing to the compensation required for the deviations due to tolerances in the shape and the positioning of the ducts. In addition, the connections between the various butt-jointed duct portions sometimes require tightening operations which are complex to carry out owing to the little space available to carry them out.

The fitting of the electrical, hydraulic and aeraulic ducts is therefore an operation which is complex, long and laborious for the operators.

The laying complexity and the poor work ergonomics in the duct installation region make mounting difficult, which is time-consuming and cost-generating.

SUMMARY OF THE INVENTION

The invention aims to overcome all or some of the aforementioned problems.

Thus, the invention relates to an aircraft duct assembly comprising at least two ducts extending along a general direction of rectilinear extent, each duct being able to be an electrical, hydraulic or aeraulic duct. This assembly comprises a duct support, each duct being connected to the duct support, the duct support comprising a first slideway element designed to cooperate with a second slideway element so as to form a slideway in the general direction of extent of the ducts.

The duct assembly proposed can thus be formed on its support, independently of its site of future installation. The first slideway element belonging to the duct assembly destines the duct assembly for installation in a suitable environment, comprising a second slideway element designed to form a slideway by cooperating with the first slideway element. Thus, the duct assembly can, in particular, be formed before being fitted in the triangle region of an aircraft fuselage by sliding it progressively into a fuselage portion along the direction of extent of the ducts and of the progressively formed slideway. This allows easy constitution of the duct assembly and also straightforward fitting of this assembly, without interference with the aircraft structure.

The first slideway element can comprise a carriage designed to cooperate with a rail of the second slideway element, or alternatively the first slideway element can comprise a rail designed to cooperate with a carriage of the second slideway element.

One of the first slideway element and of the second slideway element can comprise a suspension piece, forming a carriage runner, configured to cooperate with the rail of the other of the first slideway element and of the second slideway element.

Each suspension piece can comprise a substantially T-shaped transverse cross section comprising a straight part, termed vertical part, and a straight part, termed horizontal part, the horizontal straight part being designed to be introduced into the rail, the rail being of rectangular cross section having a longitudinal opening traversed by the vertical straight part.

The invention also relates to an aircraft fuselage portion comprising a fuselage structure comprising annular frames perpendicular to a longitudinal direction of extent of the fuselage portion, a flat floor, and vertical struts perpendicular to the floor that extend from the floor to a frame, forming a space, termed triangle region, which is delimited by an underside of the floor, the vertical struts and the frames. This fuselage portion comprises a slideway element, termed second slideway element, which is connected to or formed by the fuselage structure and which is designed to form, in the triangle region, a longitudinal slideway by cooperation with a first corresponding slideway element.

Such a fuselage portion can additionally comprise, in the triangle region, a duct assembly as described above, the first slideway element of the duct support cooperating with the second slideway element to form a slideway via which the duct assembly is connected to the fuselage structure.

The duct support of the duct assembly can be suspended from the fuselage structure by an upper part of the duct support.

The duct assembly comprises at least two ducts selected from:
- an air-distribution duct for distributing air into a cabin and/or a cockpit;
- a hydraulic duct for a hydraulic control system;
- a water duct;
- a suction duct.

The invention also relates to an aircraft comprising at least one fuselage portion as described above.

The invention finally relates to a method for mounting a duct assembly in an aircraft fuselage portion. This method comprises the steps of:
- providing an aircraft fuselage portion as defined above (before mounting a duct assembly);
- constituting a duct assembly as described above;
- bringing the first slideway element into cooperation with the second slideway element to form a slideway, and fitting the duct assembly in the fuselage portion by translation along the slideway.

BRIEF DESCRIPTION OF THE DRAWINGS

Other particular features and advantages of the invention will become further apparent from the description below.

In the appended drawings, given by way of non-limiting examples.

DETAILED DESCRIPTION OF THE PREFERRED EMBODIMENTS

Figure 1:
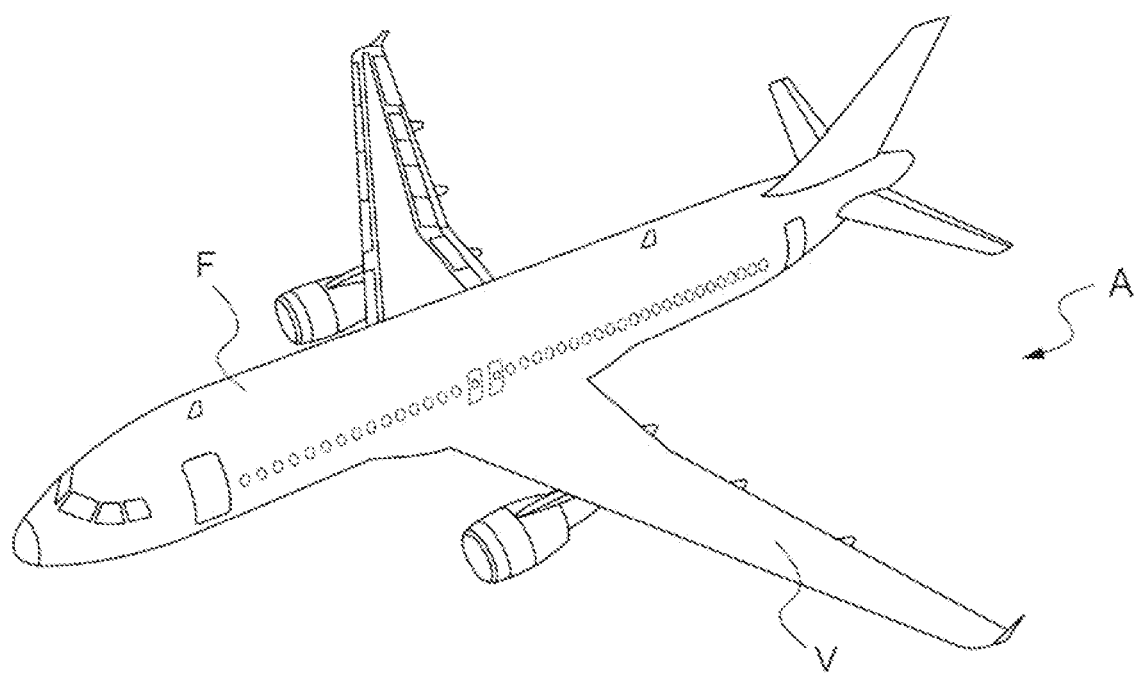
FIG. 1 shows, in a schematic three-dimensional view, a conventional example of a commercial aircraft.

FIG. 1 shows a commercial-type aircraft A, for example a passenger transport aircraft. Such an aircraft typically comprises, in a known manner, a fuselage F having a cylindrical general shape to which there is connected a wing assembly V that provides the lift of the aircraft.

Figure 2:
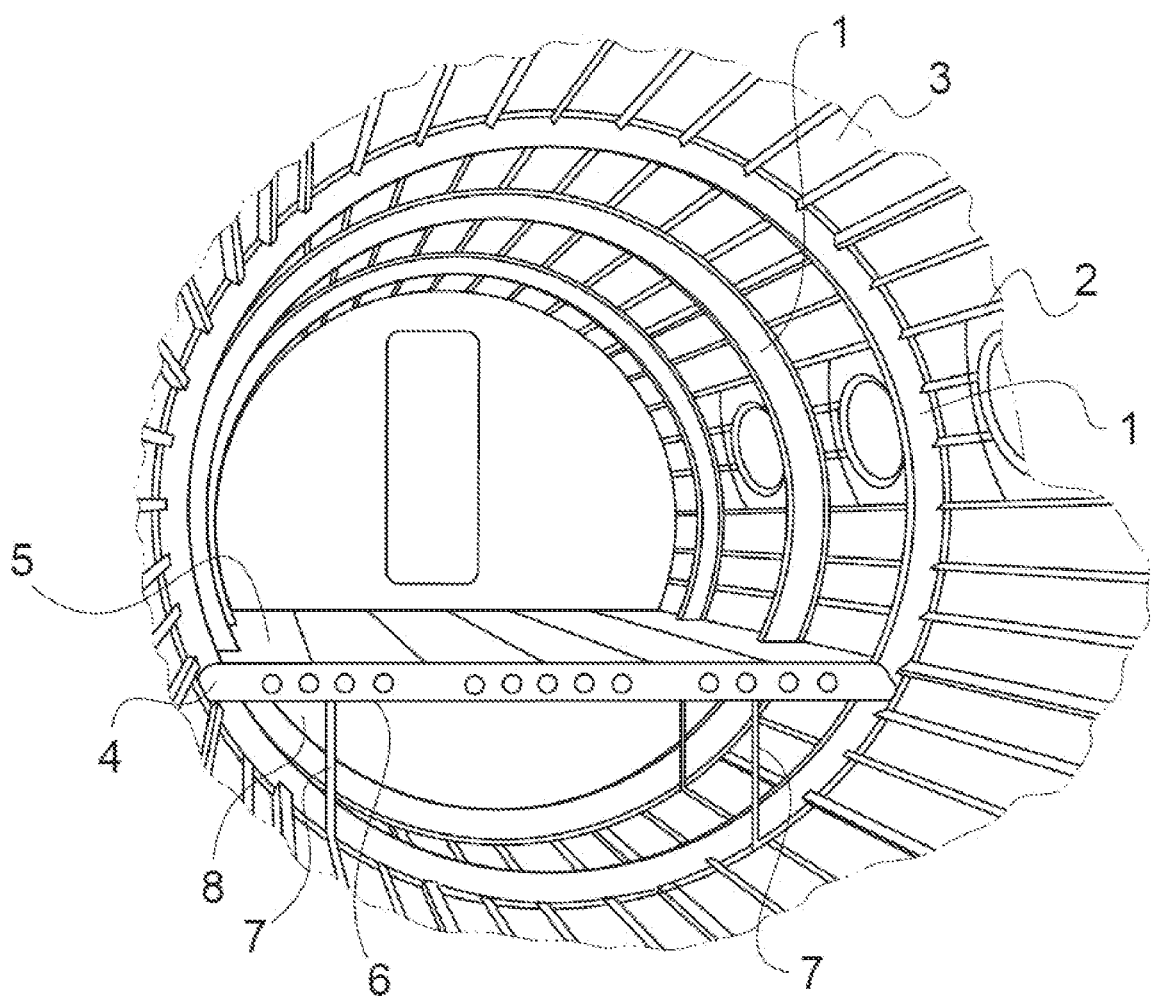
FIG. 2 shows, in a schematic three-dimensional view, a portion of an aircraft fuselage.

FIG. 2 shows, in a highly schematic manner, an aircraft fuselage portion, and illustrates in particular the structure that it conventionally has. FIG. 2 thus proposes an interior view of an aircraft fuselage portion. The fuselage structure thus comprises annular frames 1 of substantially circular general shape. The frames 1 are interconnected, along a direction, termed longitudinal direction, of extent of the fuselage, by longitudinal stringers 2 and stiffeners. The frames 1 and stringers 2 are fastened to a skin 3 forming the outer surface of the fuselage.

A floor 4 is installed in the fuselage portion. The floor 4 is substantially flat and horizontal when the aircraft comprising the fuselage portion is on the ground. It comprises an upper side 5, for example allowing the movement of passengers, the installation of furniture equipment, etc. The volume situated above the floor constitutes the cabin (and the pilot station or cockpit) of the aircraft. The floor comprises an underside 6 connected to the fuselage structure by vertical struts 7 (that is to say struts orthogonal to the floor 4, termed horizontal floor).

The volume situated in the fuselage, below the floor is employed to accommodate a large number of devices of the aircraft. The central part can, in particular, comprise at least part of the hold intended to receive baggage or other cargo, or, in other longitudinal regions of the aircraft, it can comprise the landing gear compartments.

On each side of the fuselage, below the floor, two lateral volumes are thus formed between the underside 6 of the floor, the frames 1 and the stiffeners or stringers (and the skin 3), and the vertical plane in which the struts 7 furthest away from the center of the fuselage are arranged. This region is referred to as the triangle region 8 owing to its general configuration. The triangle region 8 therefore offers a volume of substantially triangular transverse cross section extending longitudinally in the fuselage, and thus proves well-suited for receiving the longitudinal ducts, and, in particular, the main ducts which run longitudinally from the front to the rear of the fuselage so as to distribute electricity or fluids (including the vacuum so as to allow suction) to systems of the aircraft that are generally designated by the term "consumers" and that are distributed within the aircraft.

Figure 3:
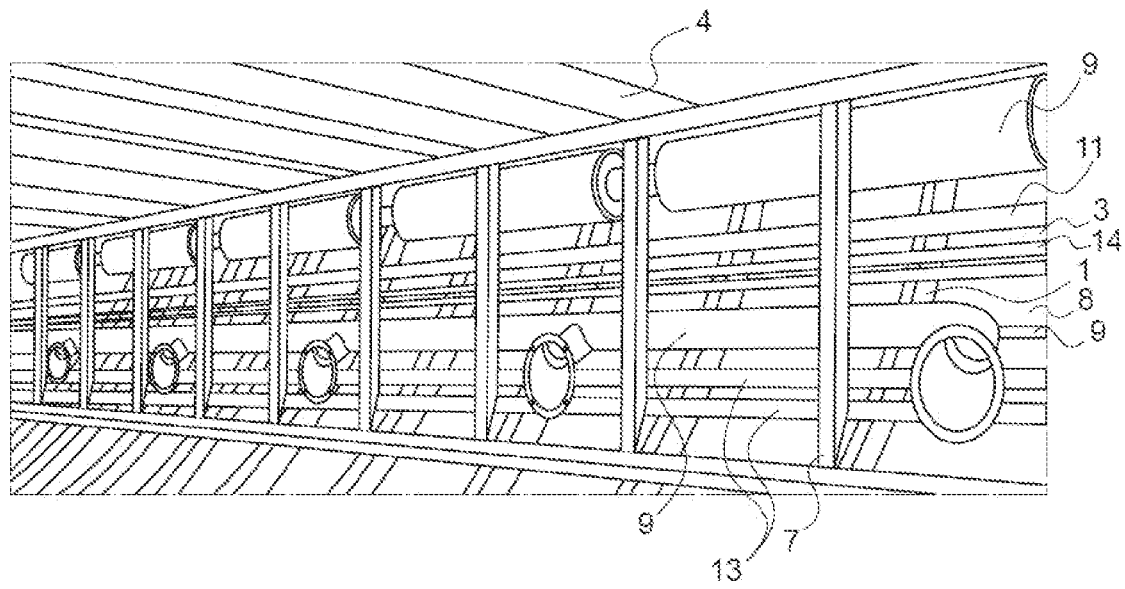
FIG. 3 shows, in a schematic three-dimensional view, an assembly of ducts which are installed in an aircraft fuselage portion according to the prior art.

An example of installation of such ducts, according to the known prior art, is shown in FIG. 3. FIG. 3, more particularly, shows the triangle region 8 of a portion of an aircraft fuselage. In a modern aircraft, numerous ducts must be installed in the triangle region 8. In the example shown here, the following are installed in the triangle region:

A plurality of large-size air-distribution ducts 9 are intended for distributing air into the cabin and, where appropriate, into the cockpit (corresponding, for example, to ventilation, air-conditioning, etc.).

One or more hydraulic ducts 14 (represented here in the form of an assembly of parallel ducts) can also be present (for actuating hydraulic systems).

A suction duct (for the toilets) 11 can also be present. At least one water duct 13 (for conducting water, for example for the toilets) can also be provided.

In this region there can also be arranged electrical ducts (cables, optionally in bundles and generally a sheath).

Owing to the complexity of access to the triangle region 8, which is clearly apparent from FIG. 3, and particularly since this region is situated in a region of the aircraft that is intrinsically difficult to access, and owing to the vertical struts 7, the various ducts are complex to install in the fuselage portion.

Particularly with regard to the majority of rigid ducts, it is necessary fit each rigid duct in portions and to connect the portions to form the duct in question. The dimensional tolerances of the various duct portions can make butt jointing thereof complex. Moreover, the confinement of the triangle region makes tightening of the connections complex. Each connection is a possible source of non-compliance and requires inspection after mounting. All of that makes the installation of the ducts in the triangle region 8 complex, costly and time-consuming.

Figure 4:
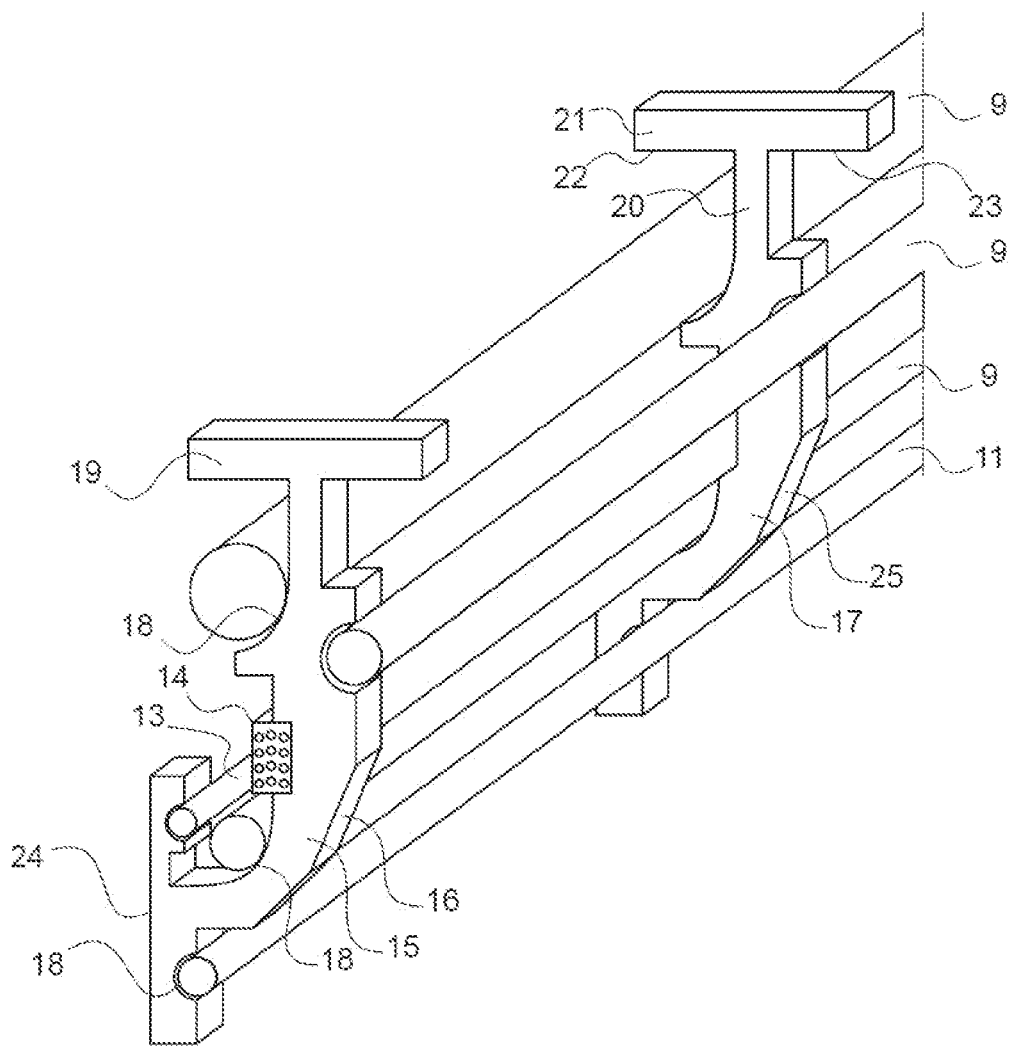
FIG. 4 shows, in a partial schematic three-dimensional view, an assembly of ducts according to one embodiment of the invention.

FIG. 4 shows an assembly according to one embodiment of the invention. Such an assembly comprises at least two ducts 9, 11, 13, 14 extending along a rectilinear direction. The ducts 9, 11, 13, 14 of the assembly are fastened to a duct support 15. The duct support 15 can be formed by a rigid element extending in the rectilinear direction of extent of the ducts, or, preferably, be formed by a plurality of duct support elements 16, 17 as in the examples shown here.

The ducts of the duct assembly can, in particular, be those (or some of those) whose function has been detailed with reference to FIG. 3.

The duct support 15 can present various configurations, and, in particular, various transverse cross sections, in order to be adapted to the ducts to be supported. In the examples shown here, the duct support 15, and therefore each duct support element 16, 17, has a plurality of receiving surfaces 18 for circular ducts, each receiving surface 18 forming an arc of a circle with a diameter corresponding to that of the duct which it is intended to receive.

The duct support 15 also comprises a first slideway element 19. A first slideway element corresponds to a piece intended to form a slideway in cooperation with a second slideway element. The first slideway element can thus generally be a carriage, for example with a runner or runners or with a roller or rollers, adapted to cooperate with a rail (which would form the second slideway element), or conversely, that is to say, the first slideway element 19 is a rail designed to cooperate with a carriage forming the second slideway element.

In the example shown in FIG. 4, the first slideway element 19 is formed by an assembly of rigid elements orthogonal to the direction of extent of the ducts 9, 11, 13, 14 of the assembly. The first slideway element 19 is positioned in a part, termed upper part, of the duct support 15; therefore, the duct assembly is designed to be suspended by the first slideway element 19. Each rigid element forming the first slideway element therefore forms, in the example shown, a suspension piece. The suspension piece comprises a substantially T-shaped transverse cross section comprising a straight part, termed vertical part 20, and a straight part, termed horizontal part 21. The horizontal straight part is designed to be introduced into a rail, and its underside forms two runners 22, 23 forming the contact surfaces of the carriage in the rail.

Each duct support element 16, 17 additionally comprises a first lateral bearing surface 24 and a second lateral bearing surface 25, the functions of which will be detailed below.

One of the major benefits of a duct assembly according to the invention and exemplified in FIG. 4 is that of being able to be constituted independently of its final installation environment, that is to say, before installation thereof in a fuselage (or more generally an aircraft fuselage portion). The duct assembly can, in particular, be formed in a workshop independent of the workshop for the final assembly of the aircraft equipped with the duct assembly. The duct assembly can be constituted on a suitable template, providing the assembly operators with the possibility of intervening without access constraint. In addition, once the duct assembly has been constituted, it is possible to test it before installation in the fuselage, thereby allowing it, if required, to be brought quickly and easily into compliance, and especially avoiding the mounting of a non-compliant assembly that would have to be subject to repairs in the very constrained environment of the fuselage.

Figure 5:
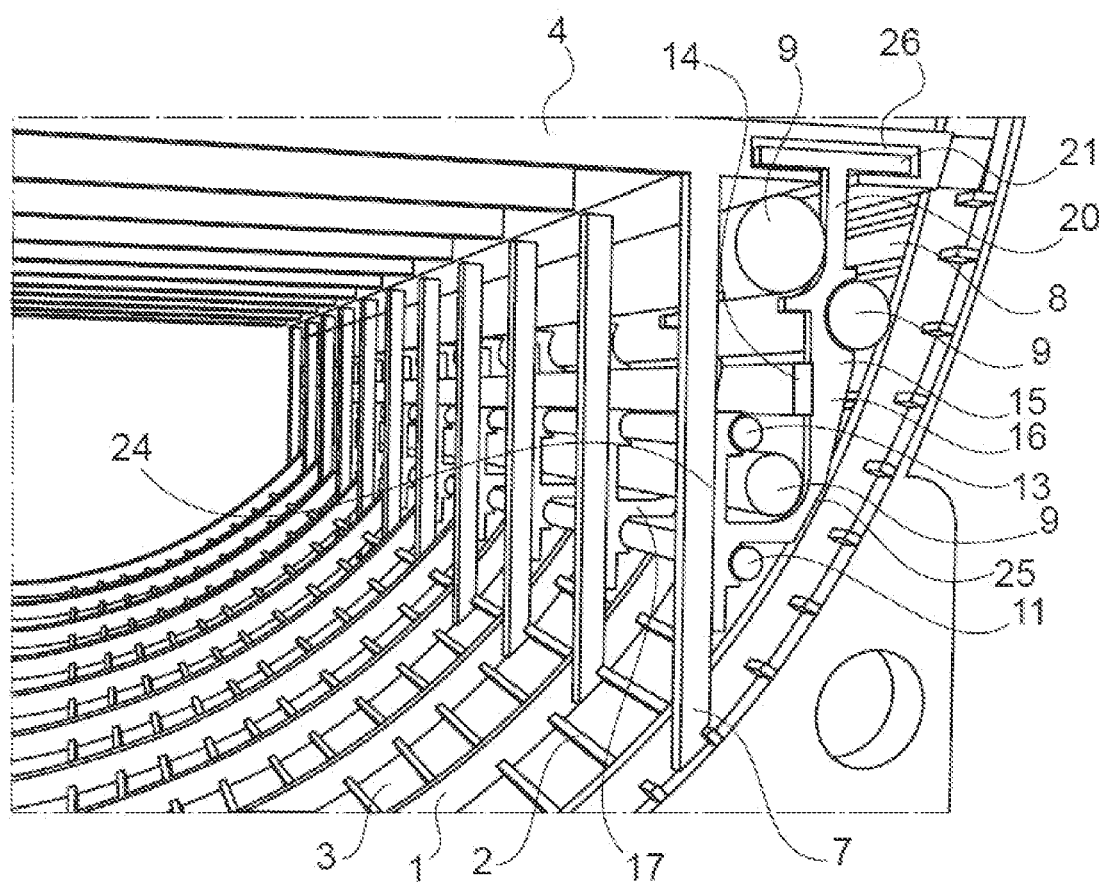
FIG. 5 shows, in a schematic three-dimensional view, am assembly of ducts which are installed in an aircraft fuselage portion according to one embodiment of the invention.

FIG. 5 shows the duct assembly from FIG. 4 installed in an aircraft fuselage portion according to one embodiment of the invention.

The fuselage portion shown in FIG. 5 has a conventional general constitution and comprises, just like the fuselage portion shown in FIG. 2, annular frames 1 interconnected, along a longitudinal direction of extent of the fuselage, by longitudinal stringers 2 and stiffeners. A skin 3 covers these elements.

A floor 4 is installed in the fuselage portion. The underside 6 of the floor is connected to the fuselage structure by vertical struts 7. A triangle region 8 is thus defined.

In the upper part of the triangle region 8, directly below the floor 4 or in the very structure of the floor 4, there is formed a second slideway element 26 designed to cooperate with the first slideway element 19 of the duct support 15.

In this instance, in the example shown, the second slideway element is a rail, in the form of a parallelepipedal hollow cross section, corresponding with play to the cross section of the horizontal straight part 21 of the suspension elements of the duct support 15. In order to allow the passage of the vertical straight part 20 of the suspension elements of the duct support 15, a longitudinal opening is formed in the lower part of the rail-forming hollow cross section.

The first slideway element 19, namely the suspension element of the duct support 15 or of each of the duct support elements 16, 17, is inserted, by longitudinal translation (the rectilinear direction of extent of the ducts being brought into correspondence with the longitudinal direction), into the second slideway element 26 forming a rail of the slideway thus constituted. Once in position, as shown in FIG. 5, the duct assembly is suspended in the triangle space 8. In order to perfectly immobilize the duct assembly in the triangle space 8, and to distribute the retaining forces, the first lateral bearing surface 24 of each of the duct support elements bears against a vertical strut 7. Likewise, the second lateral bearing surface 25 bears, where appropriate, against a frame 1. The support elements 16, 17, or some support elements, can be immobilized against longitudinal translation at the vertical struts 7, or frames 1.

Of course, numerous other first slideway elements and second slideway elements can be employed in alternative embodiments of the invention. While keeping the same support geometry, the continuous slideway can be replaced, for example, with an assembly of supports forming, on account of their alignment, a discontinuous rail as second slideway element. The slideway-forming rail/carriage configuration can be reversed. Although in translation on runner-forming surfaces is preferred (once the duct assembly is fitted, the slideway will no longer ever be used to translate this assembly, with the result that it is not necessary to employ a slideway intended for a common usage), other slideway technologies (with rollers, castors, etc.) can be employed.

In order to end up with the configuration in which the duct assembly is placed in the final position, shown in FIG. 5, the fuselage assembly is assembled according to a mounting method specific to the present invention. Thus, as detailed above, the duct assembly is formed independently of the fuselage portion. The fuselage portion, as regards its structure, including its floor, is produced so as to be able to be equipped with the duct assembly. In particular, a second slideway element is formed in the fuselage structure or attached thereto so as to be able to cooperate with the first slideway element of the duct assembly support.

The duct assembly is inserted into the fuselage portion via one of its ends. From the start of the insertion, the first slideway element is brought into cooperation with the second slideway element, with the result that the slideway is formed progressively between these two elements during the insertion of the duct assembly into the fuselage portion.

The insertion of the duct assembly is continued until the assembly is in the desired longitudinal position. Although it is preferable for there to be a single duct assembly to cover the whole length of the equipped fuselage portion, it is nevertheless possible according to the invention to longitudinally butt joint a plurality of duct assemblies in one and the same fuselage portion. This latter configuration requires forming a certain number of connections, but remains advantageous as compared with the prior art since, firstly, the number of connections to be made can be reduced, but especially with the assembly operation for the duct assemblies being carried out outside the fuselage portion, in a non-constrained environment, this assembly operation is greatly facilitated.

Moreover, the developed invention reveals itself to be particularly advantageous when it is applied to a family of aircraft having, according to the variants of the family, a plurality of lengths. Specifically, this type of aircraft family can be constituted by a base fuselage portion, for which the duct assembly can be standardized, and optionally by an additional fuselage portion. Thus, the design of a duct assembly for the base fuselage portion, and which will be employed for all the aircraft of the family, and the design of a duct assembly for the additional fuselage portion (or, where appropriate, of a duct assembly for each of the additional fuselage portions envisaged in the family), are sufficient to cover all the aircraft of the family.

The invention thus developed greatly simplifies the operations of mounting ducts in aircraft, in particular ducts installed in the under-floor triangle region, whether they be aeraulic, hydraulic or electrical ducts.

With the duct assembly being mounted outside the fuselage portion which it is intended to equip, it can be mounted without constraints for the assembly operators and it can be tested before its installation in the fuselage portion. The constitution of the ducts in a single assembly, or in a limited number of duct assemblies, makes it possible to limit the number of connections to be constituted, thereby improving the reliability of the ducts.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage portion comprising:
    a fuselage structure comprising annular frames perpendicular to a longitudinal direction of extent of said fuselage portion,
    a flat floor, and vertical struts perpendicular to the floor that extend from the floor to a frame, forming a space, termed triangle region, which is delimited by an underside of the floor, said vertical struts and said frames,
    a first slideway element and a second slideway element cooperating to support a duct support within the triangle region, the first slideway element fixed to the duct support, the second slideway element connected to or formed by the fuselage structure and which is configured to form, in said triangle region, a longitudinal slideway by cooperation with the first corresponding slideway element, the longitudinal slideway forms a rail transfer for the duct support to be transported along the longitudinal direction of the fuselage within the triangle region.

2. The fuselage portion according to claim 1, further comprising,
    in said triangle region, an aircraft duct assembly comprising at least two ducts extending along a general direction of rectilinear extent, each duct being able to be an electrical, hydraulic or aeraulic duct, and
    each duct being connected to said duct support, said duct support comprising
    the first slideway element configured to cooperate with the second slideway element to form the slideway, via which said duct assembly is connected to said fuselage structure.

3. The fuselage portion according to claim 2, wherein the first slideway element comprises a carriage configured to cooperate with a rail of the second slideway element, or in which the first slideway element comprises the rail configured to cooperate with the carriage of the second slideway element.

4. The fuselage portion according to claim 3, wherein one of the first slideway element and of the second slideway element comprises a suspension piece, forming a carriage runner, configured to cooperate with the rail of the other of the first slideway element and of the second slideway element.

5. An aircraft fuselage portion according to claim 1, wherein the duct support of a duct assembly is suspended from the fuselage structure by an upper part of said duct support.

6. The aircraft fuselage portion according to claim 2, in which the duct assembly comprises at least two ducts selected from:
    an air-distribution duct for distributing air into a cabin and/or a cockpit;
    a hydraulic duct for a hydraulic control system;
    a water duct;
    a suction duct.

7. An aircraft comprising at least one fuselage portion according to claim 1.

8. A method for mounting a duct assembly in an aircraft fuselage portion, comprising the steps of:
    providing an aircraft fuselage portion according to claim 1;
    bringing a first slideway element into cooperation with a second slideway element to form a slideway, and
    fitting the duct assembly in said fuselage portion by translation along the slideway.

9. The mounting method according to claim 8, further comprising the steps:
    constituting an aircraft duct assembly comprising at least two ducts extending in a general direction of rectilinear extent, each duct being able to be an electrical, hydraulic or aeraulic duct,
    constituting a duct support, and
    connecting each duct to said duct support.

10. An aircraft fuselage portion comprising:
    a fuselage structure comprising annular frames perpendicular to a longitudinal direction of extent of said fuselage portion, a flat floor, and vertical struts perpendicular to the floor that extend from the floor to a frame, forming a space, termed triangle region, which is delimited by an underside of the floor, said vertical struts and said frames, a first slideway element and a second slideway element, the second slideway element being connected to or formed by the fuselage structure and which is configured to form, in said triangle region, a longitudinal slideway by cooperation with the first corresponding slideway element, in said triangle region, an aircraft duct assembly comprising at least two ducts extending along a general direction of rectilinear extent, each duct being able to be an electrical, hydraulic or aeraulic duct, and a duct support, each duct being connected to said duct support, said duct support comprising the first slideway element configured to cooperate with the second slideway element to form the slideway, via which said duct assembly is connected to said fuselage structure, wherein the first slideway element comprises a carriage configured to cooperate with a rail of the second slideway element, or in which the first slideway element comprises the rail configured to cooperate with the carriage of the second slideway element, wherein one of the first slideway element and of the second slideway element comprises a suspension piece, forming a carriage runner, configured to cooperate with the rail of the other of the first slideway element and of the second slideway element, wherein each suspension piece comprises a T-shaped transverse cross section comprising a vertical straight part and a horizontal straight part, said horizontal straight part being configured to be introduced into the rail, said rail being of rectangular cross section having a longitudinal opening traversed by the vertical straight part.

* * * * *